United States Patent
Kitada et al.

(10) Patent No.: US 11,433,755 B2
(45) Date of Patent: Sep. 6, 2022

(54) DRIVE DEVICE

(71) Applicant: EXEDY Corporation, Neyagawa (JP)

(72) Inventors: Kenji Kitada, Neyagawa (JP); Yuki Kawahara, Neyagawa (JP); Tomohiro Wada, Neyagawa (JP); Takuma Shimada, Neyagawa (JP); Yukiyoshi Takada, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/397,466

(22) Filed: Aug. 9, 2021

(65) Prior Publication Data

US 2022/0072945 A1 Mar. 10, 2022

(30) Foreign Application Priority Data

Sep. 8, 2020 (JP) .............................. JP2020-150311

(51) Int. Cl.
| | |
|---|---|
| *B60K 6/40* | (2007.10) |
| *H02K 7/10* | (2006.01) |
| *F16H 45/02* | (2006.01) |
| *B60K 6/26* | (2007.10) |
| *B60K 6/387* | (2007.10) |
| *B60L 7/10* | (2006.01) |

(52) U.S. Cl.
CPC ................ *B60K 6/40* (2013.01); *B60K 6/26* (2013.01); *B60K 6/387* (2013.01); *F16H 45/02* (2013.01); *H02K 7/10* (2013.01); *B60L 7/10* (2013.01); *B60Y 2200/92* (2013.01); *B60Y 2400/426* (2013.01); *B60Y 2400/60* (2013.01); *F16H 2045/0221* (2013.01)

(58) Field of Classification Search
CPC . B60K 6/40; B60K 6/26; B60K 6/387; B60K 2006/268; F16H 45/02; F16H 2045/0221; H02K 7/10; H02K 7/075; H02K 11/21; H02K 24/00; B60L 7/10
See application file for complete search history.

(56) References Cited

U.S. PATENT DOCUMENTS

| | | | |
|---|---|---|---|
| 11,285,798 B2* | 3/2022 | Matsuoka | ................ B60K 6/40 |
| 2013/0035202 A1* | 2/2013 | Ideshio | ............... F16D 25/0638 |
| | | | 477/6 |
| 2013/0310216 A1* | 11/2013 | Kamiya | .................. F16D 25/10 |
| | | | 903/902 |
| 2019/0301581 A1* | 10/2019 | Matsuoka | ............... F16H 41/24 |

FOREIGN PATENT DOCUMENTS

JP 2009-001127 A 1/2009

* cited by examiner

*Primary Examiner* — David J Hlavka
(74) *Attorney, Agent, or Firm* — United IP Counselors, LLC

(57) ABSTRACT

A drive device includes a fluid coupling and a rotary electrical machine. The fluid coupling is configured such that a torque is inputted thereto from a first side in an axial direction and is outputted therefrom to a second side in the axial direction. The rotary electrical machine includes a first stator and a rotor. The first stator is disposed in a non-rotatable manner. The rotor is disposed to be rotated about a rotational axis of the fluid coupling. The rotary electrical machine is disposed on the second side with respect to the fluid coupling in the axial direction. The rotary electrical machine overlaps the fluid coupling in an axial view.

8 Claims, 2 Drawing Sheets

DRIVE DEVICE

CROSS-REFERENCE TO RELATED APPLICATIONS

This application claims priority to Japanese Patent Application No. 2020-150311 filed Sep. 8, 2020. The entire contents of that application are incorporated by reference herein in their entirety.

TECHNICAL FIELD

The present invention relates to a drive device.

BACKGROUND ART

There has been proposed a type of drive device in which a rotary electrical machine is attached to a torque converter. For example, Japan Laid-open Patent Application Publication No. 2009-001127 describes that an electric motor is disposed between a torque converter and an engine.

When the rotary electrical machine is attached to the torque converter as described above, shortage of space is problematic compared to a well-known configuration that the rotary electrical machine is not attached to the torque converter. Because of this, it has been demanded to make the drive device radially compact.

BRIEF SUMMARY

It is an object of the present invention to make a drive device radially compact.

A drive device according to an aspect of the present invention includes a fluid coupling and a rotary electrical machine. The fluid coupling is configured such that a torque is inputted thereto from a first side in an axial direction and is outputted therefrom to a second side in the axial direction. The rotary electrical machine includes a first stator and a rotor. The first stator is disposed in a non-rotatable manner. The rotor is disposed to be rotated about a rotational axis of the fluid coupling. The rotary electrical machine is disposed on the second side with respect to the fluid coupling in the axial direction. The rotary electrical machine overlaps the fluid coupling in an axial view.

According to the configuration, the rotary electrical machine is disposed on the second side with respect to the fluid coupling in the axial direction, while overlapping the fluid coupling in the axial view. Hence, the drive device can be made radially compact.

Preferably, the rotary electrical machine includes a field coil.

Preferably, the rotary electrical machine is disposed in adjacent to a torus of the fluid coupling in the axial direction.

Preferably, the rotor is attached to an outer shell of the fluid coupling.

The rotor can be attached to the outer shell of the fluid coupling in a position located radially inside a center of the torus of the fluid coupling. According to the configuration, the rotor is attached to a part that is less deformable. Hence, it is possible to mitigate adverse impact on the part to which the rotor is connected.

The rotor can be attached to the outer shell of the fluid coupling in a position located radially outside the center of the torus of the fluid coupling. According to the configuration, the rotor is attached to a part that is less in amount of deformation. Hence, it is possible to inhibit axial movement of the rotor caused by deformation of the fluid coupling.

Preferably, the fluid coupling includes a second stator and a one-way clutch attached to an inner peripheral end of the second stator. The one-way clutch is disposed on the second side with respect to the center of the torus of the fluid coupling in the axial direction.

Preferably, the outer shell of the fluid coupling includes an attachment surface facing radially outward. The drive device further includes an inhibiting member having an annular shape. The inhibiting member is attached at an inner peripheral surface thereof to the attachment surface.

Overall, according to the present invention, a drive device can be made radially compact.

DETAILED DESCRIPTION

A drive device according to the present preferred embodiment will be hereinafter explained with reference to drawings. It should be noted that in the following explanation, the term "axial direction" refers to an extending direction of a rotational axis of the drive device. In the following embodiment, the term "first side in the axial direction" means the left side in FIG. 1, whereas the term "second side in the axial direction" means the right side in FIG. 1. An engine is disposed on the first side in the axial direction, whereas a transmission is disposed on the second side in the axial direction. On the other hand, the term "circumferential direction" refers to a circumferential direction of an imaginary circle about the rotational axis, whereas the term "radial direction" refers to a radial direction of the imaginary circle about the rotational axis.

[Drive Device]

Figure 1:
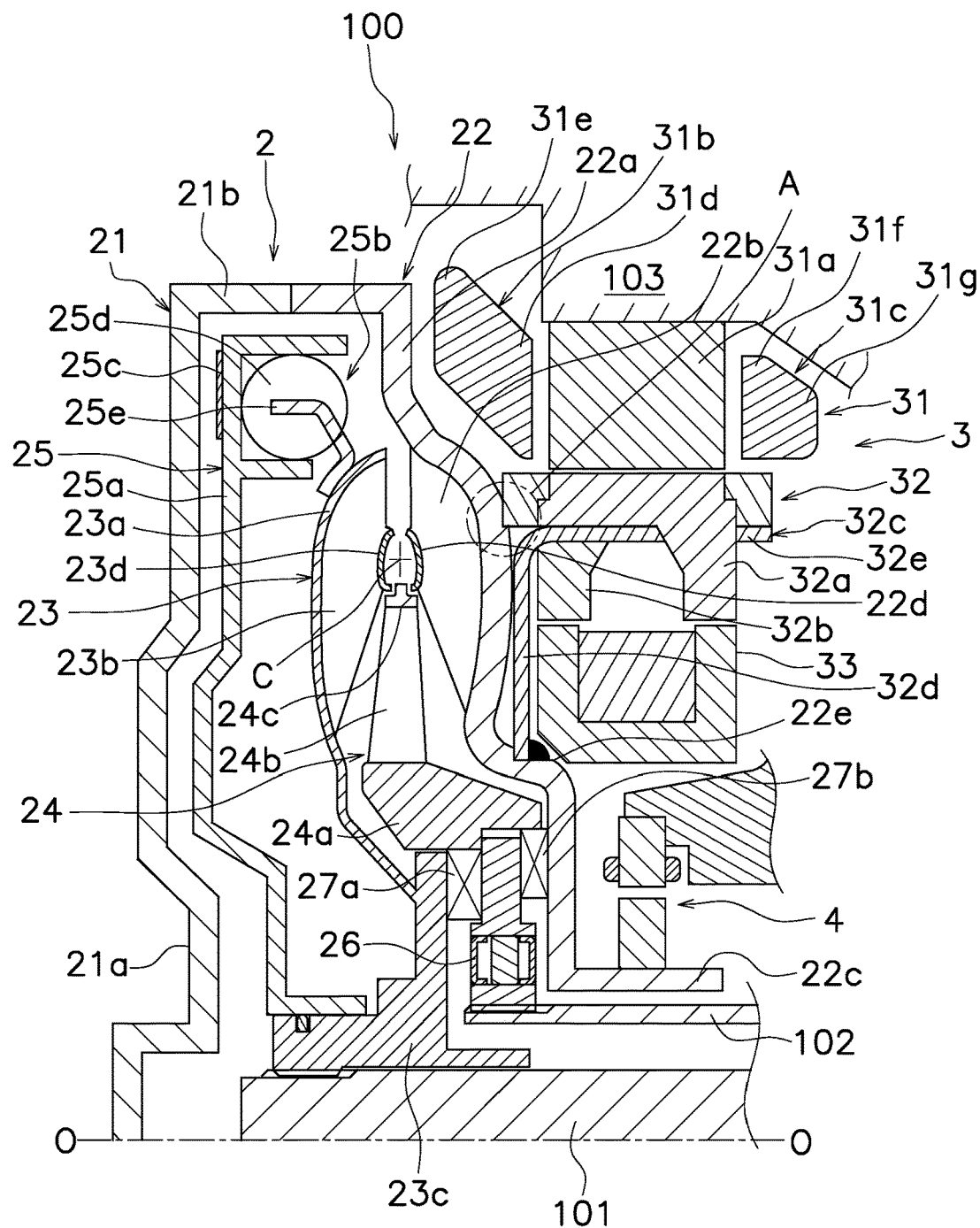
FIG. 1 is a cross-sectional view of a drive device.

As shown in FIG. 1, a drive device 100 includes a torque converter 2 (exemplary fluid coupling), a rotary electrical machine 3, and an angle sensor 4. The drive device 100 is disposed in a power transmission path extending from the engine (not shown in the drawings) to the transmission.

[Torque Converter]

The torque converter 2 is configured such that a torque is inputted thereto from the first side in the axial direction and is outputted therefrom to the second side in the axial direction. Specifically, in the present preferred embodiment, the torque converter 2 is configured such that a torque is inputted thereto from the engine and is outputted therefrom to the transmission.

The torque converter 2 includes a cover 21, an impeller 22, a turbine 23, a second stator 24, a lock-up clutch device 25, and a one-way clutch 26. The torque converter 2 is rotated about a rotational axis O. The torque converter 2 is configured to transmit the torque from the engine to the transmission through a fluid.

[Cover]

The cover 21 is a member to which the torque is inputted from the engine. The cover 21 includes a cover body 21a and a tubular portion 21b. The cover body 21a is a disc-shaped member. The tubular portion 21b extends from the outer peripheral end of the cover body 21a to the second side in the axial direction. A flexible plate (not shown in the drawings) and so forth are fixed to an outer peripheral part of the cover body 21a.

[Impeller]

The impeller 22 is fixed to the cover 21. The impeller 22 is unitarily rotated with the cover 21. The impeller 22 includes an impeller shell 22a, a plurality of impeller blades 22b, an impeller hub 22c, and an impeller core 22d.

The impeller shell 22a includes an attachment surface 22e facing radially outward. The attachment surface 22e is provided radially inside a center C of a torus of the torque converter 2. The attachment surface 22e is provided radially inside the outer peripheral surface of the second stator 24. It should be noted that the torus of the torque converter 2 means a space enclosed by the impeller shell 22a and a turbine shell 23a (to be described). Besides, the center C of the torus is the center of a space enclosed by the impeller core 22d and a turbine core 23d. It should be noted that when the torque converter 2 is of a coreless type, the center C of the torus is determined under the assumption that the torque converter 2 includes an impeller core and a turbine core.

The impeller blades 22b are fixed to the inner side of the impeller shell 22a. The impeller hub 22c is fixed to the inner peripheral end of the impeller shell 22a. The impeller hub 22c extends from the inner peripheral end of the impeller shell 22a to the second side in the axial direction. It should be noted that in the present preferred embodiment, the impeller hub 22c is provided together with the impeller shell 22a as a single member but can be provided as a member separated from the impeller shell 22a. The impeller shell 22a, the impeller hub 22c, and the cover 21 compose an outer shell of the torque converter 2.

[Turbine]

The turbine 23 is disposed in axial opposition to the impeller 22. The turbine 23 mainly includes the turbine shell 23a, a plurality of turbine blades 23b, a turbine hub 23c, and the turbine core 23d.

The turbine blades 23b are fixed to the inner surface of the turbine shell 23a. The turbine hub 23c is fixed to the inner peripheral end of the turbine shell 23a. The turbine hub 23c is fixed to the turbine shell 23a by a plurality of rivets (not shown in the drawings) and/or so forth. Besides, the turbine hub 23c is provided with splines on the inner peripheral surface thereof so as to be engaged with an input shaft 101 of the transmission.

[Second Stator]

The second stator 24 is a mechanism for regulating the flow of hydraulic oil returning from the turbine 23 to the impeller 22. The second stator 24 is disposed between the impeller 22 and the turbine 23. The second stator 24 mainly includes a stator shell 24a, a plurality of stator blades 24b provided on the outer peripheral surface of the stator shell 24a, and a second stator core 24c.

A first thrust bearing 27a is disposed between the turbine 23 and the second stator 24, whereas a second thrust bearing 27b is disposed between the second stator 24 and the impeller 22.

[One-Way Clutch]

The one-way clutch 26 is attached to the inner peripheral end of the second stator 24. The second stator 24 is supported by a stationary shaft 102 having a tubular shape through the one-way clutch 26. The stationary shaft 102 extends between the outer peripheral surface of the input shaft 101 of the transmission and the inner peripheral surface of the impeller hub 22c. The stationary shaft 102 is disposed in a non-rotatable manner.

The one-way clutch 26 is disposed on the second side with respect to the center C of the torus of the torque converter 2 in the axial direction. Besides, the one-way clutch 26 is disposed on the second side with respect to the stator blades 24b in the axial direction.

The one-way clutch 26 does not overlap the stator blades 24b in a radial view. By contrast, the one-way clutch 26 overlaps a first coil end 31b (to be described) in the radial view.

[Lock-Up Clutch Device]

The lock-up clutch device 25 is configured to allow and block transmission of the torque between the impeller 22 and the turbine 23. In the present preferred embodiment, the lock-up clutch device 25 is configured to allow and block transmission of the torque between the impeller 22 and the turbine 23 through the cover 21.

The lock-up clutch device 25 is disposed between the cover 21 and the turbine 23 and is configured to mechanically couple and decouple the both. The lock-up clutch device 25 includes a piston plate 25a and a damper device 25b.

[Piston Plate]

The piston plate 25a is supported by the turbine hub 23c so as to be rotatable relative thereto and be movable in the axial direction. When moved toward the cover 21, the piston plate 25a is engaged by friction with the cover 21 and is unitarily rotated therewith.

The piston plate 25a has a disc shape and includes an opening in the middle thereof. The piston plate 25a is provided with a friction material 25c fixed to the cover 21-side surface of the outer peripheral end thereof. The friction material 25c has an annular shape. When the friction material 25c is pressed against the cover 21, a power is transmitted from the cover 21 to the piston plate 25a. In other words, the friction material 25c attached to the piston plate 25a is provided as a clutch part.

<Damper Device>

The damper device 25b includes a plurality of elastic members 25d and a driven plate 25e. The driven plate 25e is fixed to the turbine shell 23a.

The elastic members 25d are configured to elastically couple the turbine 23 and the piston plate 25a therethrough. When described in detail, the elastic members 25d are engaged with the driven plate 25e and an engaging part (not shown in the drawings) provided in the piston plate 25a.

[Rotary Electrical Machine]

The rotary electrical machine 3 functions as an electric motor for rotating and driving a drive wheel. Besides, the rotary electrical machine 3 also functions as a power generator. For example, the rotary electrical machine 3 functions as the power generator in deceleration.

The rotary electrical machine 3 is disposed to overlap the torque converter 2 in an axial view. When described in detail, the rotary electrical machine 3 is disposed in adjacent to the torque converter 2 in the axial direction. Besides, the rotary electrical machine 3 overlaps the impeller hub 22c in the radial view. The rotary electrical machine 3 is disposed on the second side with respect to the torque converter 2 in the axial direction. In other words, the torque converter 2, the rotary electrical machine 3, and the transmission (not shown in the drawings) are disposed in the axial direction, while being aligned in this order.

The rotary electrical machine 3 includes a first stator 31 and a rotor 32. Besides, the rotary electrical machine 3 further includes a field coil 33. The rotary electrical machine 3 is made in shape of an annulus about the rotational axis O.

[First Stator]

The first stator 31 is disposed in a non-rotatable manner. Specifically, the first stator 31 is attached to a housing 103.

The first stator 31 can be directly attached to the housing 103, or alternatively, can be indirectly attached thereto.

The first stator 31 includes a first stator core 31a, the first coil end 31b, and a second coil end 31c. The first stator 31 has an annular shape.

The first stator core 31a has a cylindrical shape. The first stator core 31a is fixed at the outer peripheral surface thereof to the housing 103. The first stator core 31a is less in outer diameter than the torque converter 2. The first stator core 31a is formed by laminating a plurality of magnetic steel plates. A stator coil is wound about the first stator core 31a. When described in detail, the stator coil is inserted into a plurality of slots produced between a plurality of teeth of the first stator core 31a.

The first and second coil ends 31b and 31c compose part of the stator coil. Specifically, the first and second coil ends 31b and 31c are portions of the stator coil that axially protrude from the first stator core 31a.

The first and second coil ends 31b and 31c protrude from the first stator core 31a in opposite directions to each other. In the present preferred embodiment, the first coil end 31b protrudes from the first stator core 31a to the first side in the axial direction, whereas the second coil end 31c protrudes from the first stator core 31a to the second side in the axial direction. The first and second coil ends 31b and 31c are each made in shape of an annulus about the rotational axis O as a whole.

The first coil end 31b is bent radially outward. When described in detail, the first coil end 31b is bent radially outward from a base portion 31d. Besides, the first coil end 31b is in part located radially outside the outer peripheral surface of the first stator core 31a. When described in detail, a tip portion 31e of the first coil end 31b is in part located radially outside the outer peripheral surface of the first stator core 31a. It should be noted that the base portion 31d is one of end portions of the first coil end 31b and is located close to the first stator core 31a in the axial direction. By contrast, the tip portion 31e is the other of the end portions of the first coil end 31b and is located apart from the first stator core 31a in the axial direction.

The base portion 31d of the first coil end 31b is located radially inside the outer peripheral surface of the first stator core 31a. On the other hand, the tip portion 31e of the first coil end 31b is in part located radially outside the outer peripheral surface of the first stator core 31a. The first coil end 31b is greater in outermost diameter than the first stator core 31a.

The first coil end 31b is configured to increase in outer diameter from the base portion 31d to the tip portion 31e. When described in detail, the base portion 31d of the first coil end 31b is less in outer diameter than the first stator core 31a, whereas the tip portion 31e of the first coil end 31b is greater in outer diameter than the first stator core 31a. It should be noted that the diameter of the first coil end 31b refers to distance from the rotational axis O.

Besides, the first coil end 31b is configured to increase in inner diameter from the base portion 31d to the tip portion 31e. It should be noted that the inner diameters of the base portion 31d and the tip portion 31e of the first coil end 31b are smaller than the outer diameter of the first stator core 31a.

As described above, the first coil end 31b increases in both outer diameter and inner diameter from the base portion 31d to the tip portion 31e. Because of this, the base portion 31d and the tip portion 31e of the first coil end 31b are substantially equal in radial dimension.

The first coil end 31b overlaps the torus of the torque converter 2 in the radial view. When described in detail, the first coil end 31b overlaps the impeller blades 22b in the radial view. On the other hand, the first stator core 31a does not overlap the torus of the torque converter 2 in the radial view.

Besides, the tip portion 31e of the first coil end 31b is disposed not to overlap the torus of the torque converter 2 in the axial view. It should be noted that in the present preferred embodiment, substantially the entirety of the first coil end 31b does not overlap the torus of the torque converter 2 in the axial view.

Moreover, the first coil end 31b substantially overlaps the torque converter 2 in the axial view. It should be noted that in the present preferred embodiment, the outer peripheral part of the tip portion 31e of the first coil end 31b does not overlap but alternatively can overlap the torque converter 2 in the axial view.

Unlike the first coil end 31b, the second coil end 31c is not bent radially outward. It should be noted that the second coil end 31c is molded in part. When described in detail, the second coil end 31c reduces in outer diameter from a base portion 31f to a tip portion 31g. On the other hand, the second coil end 31c is substantially constant in inner diameter from the base portion 31f to the tip portion 31g.

[Rotor]

The rotor 32 is configured to be rotated about the rotational axis O. The rotor 32 is attached to the outer shell (the impeller shell 22a) of the torque converter 2. When described in detail, the rotor 32 is attached to the attachment surface 22e of the impeller shell 22a. In other words, the rotor 32 is attached to the torque converter 2 in a position located radially inside the center C of the torus of the torque converter 2. The position, in which the rotor 32 is attached to the torque converter 2, is located radially inside the outer peripheral surface of the second stator 24. The rotor 32 also makes contact with the impeller shell 22a at a part A so as to be radially positioned. It should be noted that the rotor 32 is not fixed to the impeller shell 22a at the part A.

The rotor 32 has a cylindrical shape and is disposed radially inside the first stator 31. In other words, the rotary electrical machine 3 according to the present preferred embodiment is of an inner rotor type. The rotor 32 is opposed at the outer peripheral surface thereof to the inner peripheral surface of the first stator 31 at an interval. The rotor 32 is made in form of a so-called claw pole type. Specifically, the rotor 32 includes a plurality of first claw poles 32a and a plurality of second claw poles 32b. The first claw poles 32a and the second claw poles 32b are alternately disposed in the circumferential direction. The first claw poles 32a and the second claw poles 32b are each made of a magnetic material such as iron. The first claw poles 32a and the second claw poles 32b are insulated from each other. For example, a non-magnetic material such as aluminum is disposed between adjacent first and second claw poles 32a and 32b.

The rotor 32 includes a support member 32c (exemplary inhibiting member). The support member 32c supports the first claw poles 32a and the second claw poles 32b. The support member 32c is attached to the impeller shell 22a. When described in detail, the support member 32c is attached to the attachment surface 22e of the impeller shell 22a.

The support member 32c includes a disc portion 32d having an annular shape and a cylindrical portion 32e. The disc portion 32d is attached at the inner peripheral surface thereof to the attachment surface 22e of the impeller shell 22a. The cylindrical portion 32e extends from the outer peripheral end of the disc portion 32d to the second side in the axial direction. The first and second claw poles 32a and 32b are supported by the cylindrical portion 32e.

[Field Coil]

The field coil 33 is disposed radially inside the rotor 32. The field coil 33 has a cylindrical shape. The field coil 33 is opposed at the outer peripheral surface thereof to the inner peripheral surface of the rotor 32 at an interval. The field coil 33 is disposed in a non-rotatable manner. For example, the field coil 33 is attached to the housing 103 in a similar manner to the first stator 31.

The field coil 33 is configured to excite the rotor 32 by applying a magnetizing force to the rotor 32. Electric current to be supplied to the field coil 33 is regulated by a current control unit (not shown in the drawings), whereby the magnetizing force applied to the rotor 32 can be regulated, and further, induced voltage to be generated in the first stator 31 can be regulated.

When electric current is supplied to the field coil 33, the first and second claw poles 32a and 32b are excited. For example, the first claw poles 32a are excited into N poles, whereas the second claw poles 32b are excited into S poles. Thus, in the rotor 32, N poles and S poles are alternately arranged in the circumferential direction. When the rotor 32 is rotated, the induced voltage (induced electromotive force) is generated in first the stator 31.

[Angle Sensor]

The angle sensor 4 is configured to detect the rotational speed of the rotor 32 of the rotary electrical machine 3. When described in detail, the angle sensor 4 is configured to detect the rotational speed of the outer shell of the torque converter 2 unitarily rotated with the rotor 32.

The angle sensor 4 is, for instance, a resolver. For example, the angle sensor 4 is disposed radially inside the rotary electrical machine 3. When described in detail, the angle sensor 4, the field coil 33, the rotor 32, and the first stator 31 are disposed in this order from radially inside. The angle sensor 4 overlaps the rotary electrical machine 3 in the radial view. The angle sensor 4 overlaps the one-way clutch 26 in the axial view.

[Modifications]

One preferred embodiment of the present invention has been explained above. However, the present invention is not limited to the above, and a variety of changes can be made without departing from the gist of the present invention.

Modification 1

In the preferred embodiment described above, the rotary electrical machine 3 is composed of the first stator 31, the rotor 32, and the field coil 33. However, the composition of the rotary electrical machine 3 is not limited to this. For example, the rotary electrical machine 3 can be composed of the first stator 31 and the rotor 32. In other words, the rotary electrical machine 3 may not include the field coil 33. In this case, the rotor 32 is made of, for instance, permanent magnets.

Modification 2

The rotor 32 can be attached to the torque converter 2 in a position located radially outside the center C of the torus of the torque converter 2. The rotor 32 can be attached to the torque converter 2 in a position located radially outside the outer peripheral surface of the second stator 24 of the torque converter 2.

Modification 3

The angle sensor 4 can be disposed to overlap the torus in the radial view.

Modification 4

In the preferred embodiment described above, the first coil end 31b of the first stator 31 protrudes from the first stator core 31a to the first die in the axial direction. However, the configuration of the first coil end 31b is not limited to this. For example, the first coil end 31b can protrude from the first stator core 31a to the second side in the axial direction, whereas the second coil end 31c can protrude from the first stator core 31a to the first side in the axial direction.

Modification 5

In the preferred embodiment described above, the first coil end 31b is bent radially outward. However, the configuration of the first coil end 31b is not limited to this. For example, the first coil end 31b may not be radially bent.

Modification 6

In the preferred embodiment described above, the rotary electrical machine 3 is of an inner rotor type. Alternatively, the rotary electrical machine 3 can be of an outer rotor type.

Modification 7

In the preferred embodiment described above, the outer shell of the torque converter 2 is composed of the impeller shell 22a and the cover 21. However, the composition of the torque converter 2 is not limited to this. For example, the outer shell of the torque converter 2 can be composed of the cover 21 and the turbine shell 23a. In this case, the impeller 22 and the turbine 23 are switched in position compared to the preferred embodiment described above. In other words, the impeller 22 is disposed inside the outer shell of the torque converter 2. Besides, the torque outputted from the engine is transmitted to the impeller 22 by a transmission shaft that extends to the interior of the torque converter 2 while penetrating the outer shell.

Modification 8

Figure 2:
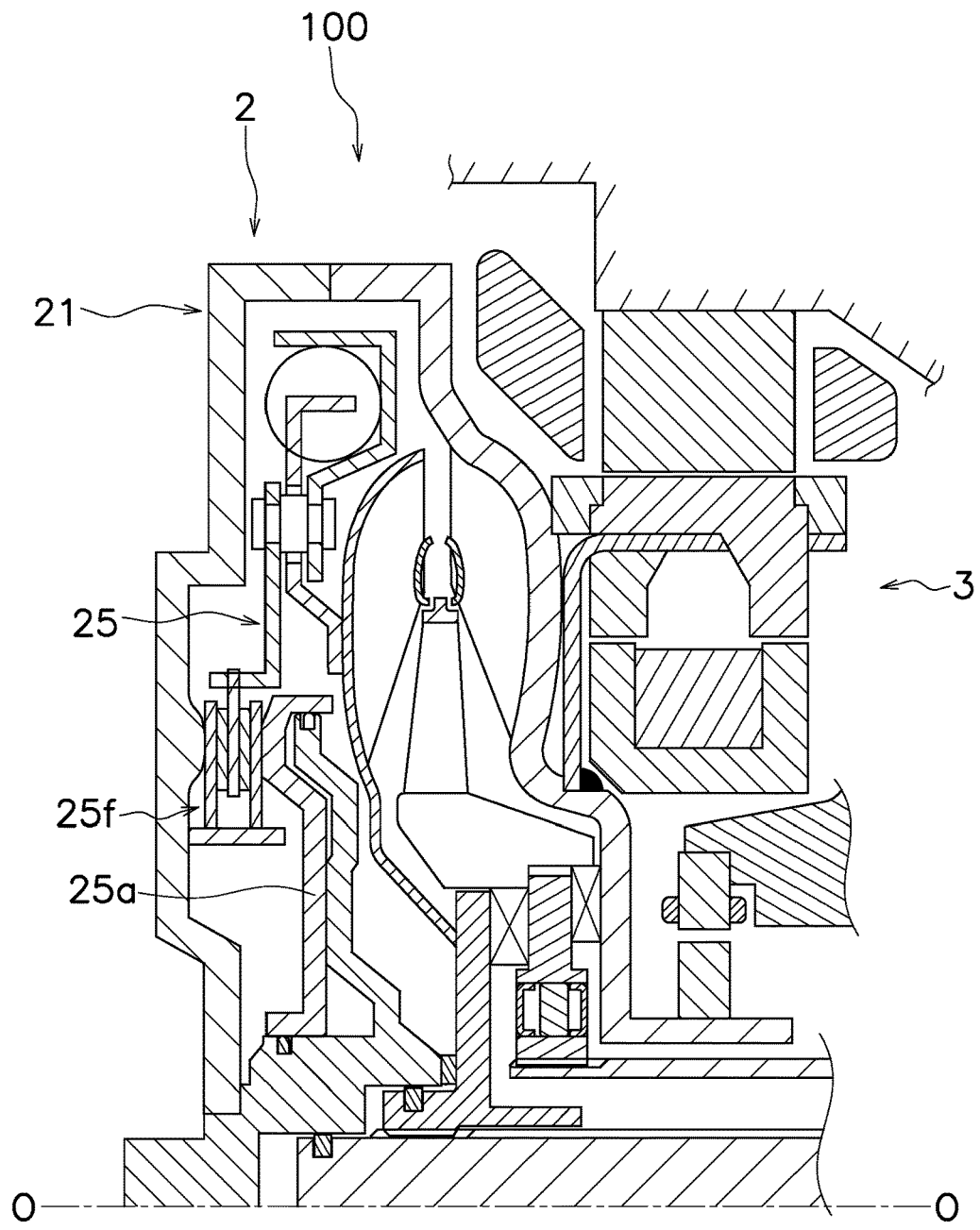
FIG. 2 is a cross-sectional view of a drive device according to a modification.

In the preferred embodiment described above, the friction material 25c is provided as the clutch part of the lock-up clutch device 25. However, the clutch part is not limited to this. For example, as shown in FIG. 2, a multi-plate clutch 25f can be provided as the clutch part of the lock-up clutch device 25.

REFERENCE SIGNS LIST

2 Torque converter
22e Attachment surface
23 Turbine
24 Second stator
26 One-way clutch
3 Rotary electrical machine
31 First stator
32 Rotor
33 Field coil
32c Support member
4 Angle sensor

What is claimed is:

1. A drive device comprising:
a fluid coupling configured such that a torque is inputted thereto from a first side in an axial direction and is outputted therefrom to a second side in the axial direction; and
a rotary electrical machine including a first stator and a rotor, the first stator disposed in a non-rotatable manner, the rotor disposed to be rotated about a rotational axis of the fluid coupling,
the rotary electrical machine disposed on the second side with respect to the fluid coupling in the axial direction, the rotary electrical machine overlapping the fluid coupling in an axial view.

2. The drive device according to claim 1, wherein the rotary electrical machine includes a field coil.

3. The drive device according to claim 1, wherein the rotary electrical machine is disposed adjacent to a torus of the fluid coupling in the axial direction.

4. The drive device according to claim 1, wherein the rotor is attached to an outer shell of the fluid coupling.

5. The drive device according to claim 1, wherein the rotor is attached to an outer shell of the fluid coupling in a position located radially inside a center of a torus of the fluid coupling.

6. The drive device according to claim 1, wherein the rotor is attached to an outer shell of the fluid coupling in a position located radially outside a center of a torus of the fluid coupling.

7. The drive device according to claim 1, wherein
the fluid coupling includes a second stator and a one-way clutch, the one-way clutch attached to an inner peripheral end of the second stator, and
the one-way clutch is disposed on the second side with respect to a center of a torus of the fluid coupling in the axial direction.

8. The drive device according to claim 1, further comprising:
an inhibiting member having an annular shape, wherein
an outer shell of the fluid coupling includes an attachment surface facing radially outward, and
the inhibiting member is attached at an inner peripheral surface thereof to the attachment surface.

* * * * *